United States Patent Office 3,424,570
Patented Jan. 28, 1969

3,424,570
MACHINE FOR THE MANUFACTURE OF GLASS HOLLOW WARE
Dieudonné Marie Couquelet, 51 Ave. Montefiore, Esneux, Belgium
Filed Jan. 21, 1966, Ser. No. 522,270
Claims priority, application Belgium, Feb. 4, 1965, 659,297
U.S. Cl. 65—276      5 Claims
Int. Cl. C03b 23/10

ABSTRACT OF THE DISCLOSURE

A machine for the manufacture of bottles with a neck from glass tubes comprises a stator, a continuously rotating vertical-axis rotor provided with gripper heads at its periphery and two neck-forming systems disposed side by side and each composed of two forming rollers and a mandrel, said neck-forming systems being supported on two slidable support elements which are supported on a bearer element sliding on a straight guide track mounted on a supporting element which can be moved away from the rotor.

---

For the manufacture of hollow ware from glass tubes, machines are known which comprise a continuously rotating vertical-axis rotor which at its periphery is provided with gripper heads formed by rotating grippers situated one above the other, the top grippers remaining at a fixed level while the bottom grippers slide vertically by the action of push rods terminating in rollers running on a cylindrical cam so profiled as to permit drawing of the tube which is plasticised by external milling or heating of the tube, without the introduction of a punch into the tube, but simply by means of a forming roller mounted to swivel on a support which pivots by the action of the fork cooperating with the grippers.

Although machines of this kind are advantageous because their continuous rotation enables them to give a high rate of production, they have not hitherto been used for the production of necked bottles.

The neck of small bottles is at the present time made by milling the heated tube end into which a mandrel has been introduced, this operation being carried out on intermitently operating machines, i.e., they stop to allow forming to be carried out; they therefore have the serious disadvantage of a relatively low output.

According to the present invention there is provided a machine for the manufacture of glass hollow ware, e.g., bottles with a neck produced by forming the end of glass tubes held by top grippers which, like the bottom grippers, are borne by a vertical rotor which rotates to bring the said tubes successively into register with the different working stations borne by the stator, characterised in that it comprises two neck forming systems disposed side by side, two bearing elements for these systems each on a top gripper, two slidable support elements for the respective neck forming systems and bearing elements, a bearer element for the supporting elements, a support means for the bearer element, a guide track on which the support means slides, means for securing the support means to the rotor to drive it over a limited path, means for disengaging the support means, means for returning the support means to the initial position, and a bearing element for the guide track mounted on the stator.

A specific embodiment of this invention will now be described by way of example with reference to the accompanying drawings, in which.

With reference to the drawings, which give only those elements required for an understanding of the invention, it will be seen that the machine comprises in known manner a base 1a on which is mounted a rotating vertical drum or rotor which comprises top grippers 23 and bottom grippers 23a.

Figure 1:
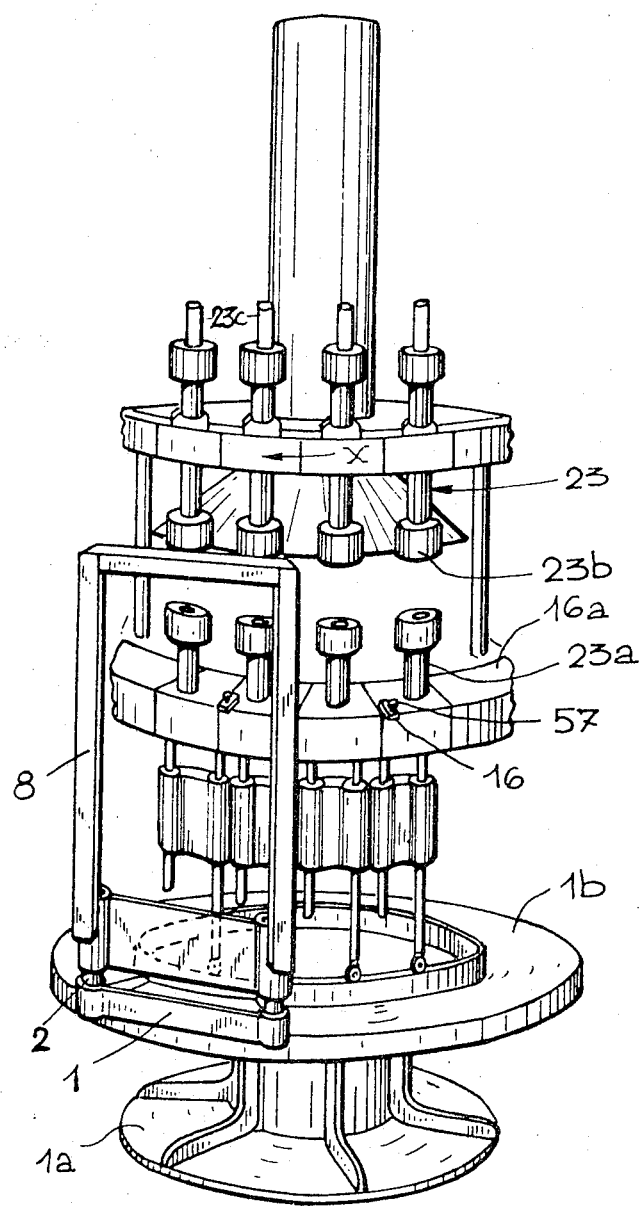
FIGURE 1 is a partial diagrammatic perspective of a bottle making machine.
Figure 2:
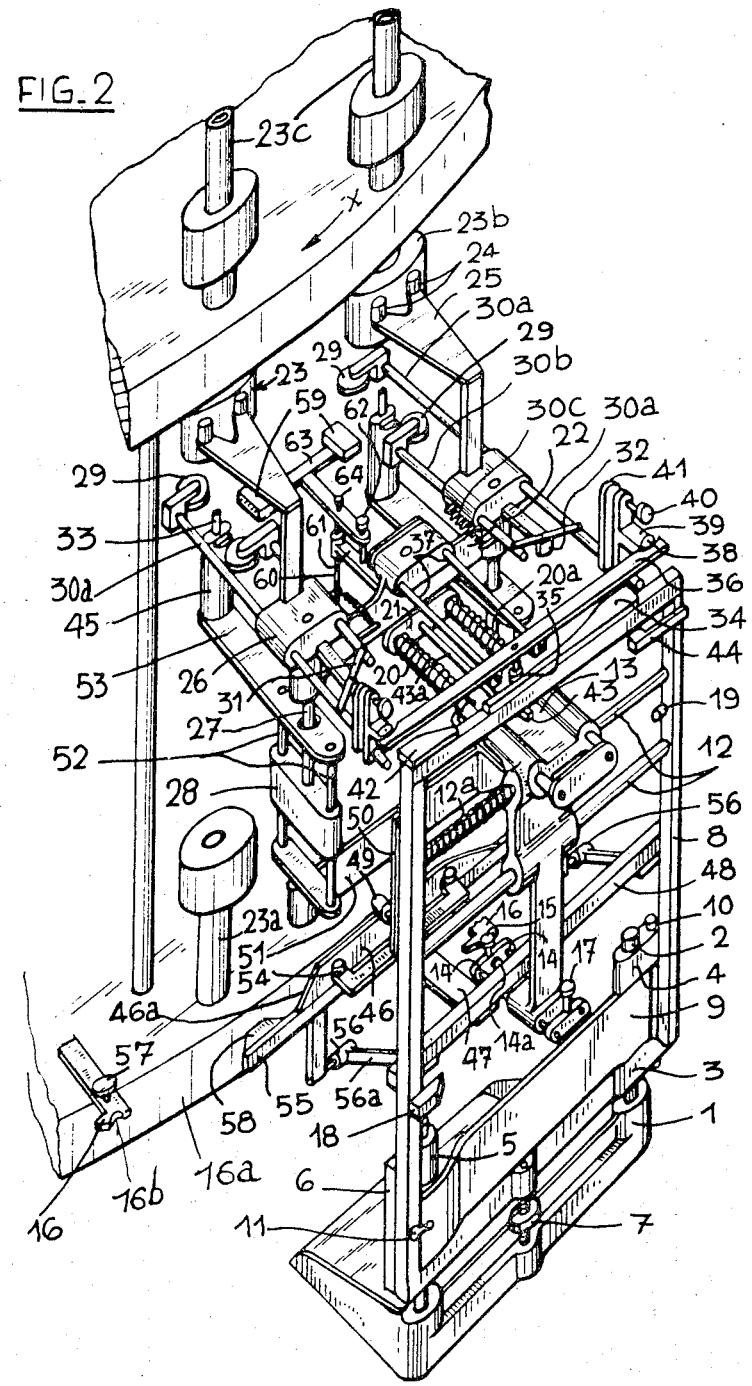
FIGURE 2 is a partial diagrammatic perspective of the neck forming systems on an enlarged scale.

A fixed support 1 bearing two lateral columns 2, is mounted on bottom plate 1b of the stator. Referring to FIGURE 2, base support 3 and elements 4 and 5 connected to the support by bars 6 are mounted on the columns 2; the elements 4 and 5 and the support 3 are slidable on the columns 2; this sliding movement is advantageous because it enables the level of the support 3 to be adjusted with respect to the plate 1b by means of the knob 7.

A pivot 10 is mounted on the support 3 and on it is disposed a supporting element 8, which is similar to a frame, the pivot 10 acting as a hinge for the supporting element 8 which is held in place by the bolt 11. The pivotable mounting of the element 8 on the pivot 10 is advantageous because it gives ready access to the parts disposed behind the said element for any adjustments required.

The supporting element 8 is provided with two straight rods 12 which form the guide track for the support means 13.

At its lower end, support means 13 has two transversely slidable rods 14 at one end of which is a roller 15 which can be accommodated in a recess 16b provided in drive lug 16; this roller is the means for engaging the support means 13 against the rotor. The drive lug 16 is rigidly connected to the bottom plate 16a of the rotor which rotates in the direction of the arrow X (see the top plate).

At the opposite end, the rods 14 have a disengagement means comprising a roller 17 which when the support means 13 is driven mounts the inclined surface of the cam 18 so that the roller 15 is withdrawn from the recess 16b in the lug 16. At the end of the movement, the support means 13 is disengaged from the rotor and is pushed back into its initial position by means of a spring 12a which is mounted on the guide track rods 12 and which was compressed during the drive movement. After the roller 15 has been freed, the support means 13 is pushed back by the spring 12a to its initial position in which the said means 13 bears against the rubber stop 19; the return impact of said means 13 is damped by an adjustable hydraulic brake (not shown). In the initial position, the sliding rods are pushed toward the centre of the rotor by the spring 14a.

At its upper end, the support means 13 is provided with two slidable rods 20 which support a bearing 21 to which is secured a bearer element 22 in the form of a link. This system is necessary because the support means 13 slides along a rectilinear path while the bearer element 22 has to follow the circular path of the rotor.

At the two ends of the bearer element 22 are disposed two vertical uprights 27 which bear the supporting elements 26. The uprights 27 are pivotable in the bearer element 22. At the end of the uprights 27 are secured elements 28 which slide on vertical rods 52 bearings arms 53 at the end of which are secured bushes 45 which bear the mandrels, e.g. 33. The vertical rods 52 are mounted at the ends of a link 51 and have a member 50 to which is secured the roller 49 providing the vertical sliding movement of the mandrels; the roller 49 runs on the cam 46 secured to the supporting element 8. In this way, when the support means 13 is driven, the mandrels are introduced into the end of the glass tubes when the roller 49 runs on the ascending part of the cam 46 and withdrawn therefrom by sliding downwards when the roller 49 runs on the descending part 46a of the cam 46.

The support elements 26 are provided with a member 25 terminating in a fork which is provided with the two rollers 24 which bear on the bottom part 23b of the top grippers 23; in this way a bearing element is formed which is perfectly centred with respect to the centre of the glass tube 23c.

The supporting elements 26 are slightly pivotable on the uprights 27 so that the bearer element 25 and the forming systems can swivel and follow any small movements of the heads holding the tubes. The rollers 24 and the mandrels 33 are thus continuously held in a correct position with respect to the gripper. The firm contact of the rollers 24 on the bottom parts 23b of the top grippers is due to the thrust of two compression springs, e.g. 20a disposed on the sliding rods 20 between the support means 13 and the bearing 21. Two outer and two inner sliding rods, 30a and 30b respectively, also extend through each of the two support elements 26 and are connected by a link 31; the forming rollers, e.g., 29, are disposed at the ends of these rods. The outer rods 30a are continued by a member 41 provided with an adjusting knob 40 and a lug 39 bearing a roller 38 which bears on a link 36 which connects the two neck forming systems, which are symmetrical with respect to a vertical radical plane passing through the centre of the bearer element 22. The link 36 has a roller 35 which runs on a cam 34 which allows the inner rods 30b to move towards the centre of the rotor under the action of springs 30c; by the action of the links 31 the outer rods 30a move away towards the exterior of the rotor; in this way as a result of this system, the forming rollers 29 move together and bear at dismetrically opposite points against the end of the two successive tubes, e.g., 23c which are heated. When the roller 35 is practically at the centre of its travel on the cam 34, the outer rods 30a are in the end position farthest away from the centre of the rotor and the inner rods 30b are in the end position nearest the centre of the rotor so that the rollers 29 which they bear are applied firmly to the heated tube end, e.g., 23c, and form the neck therein. It should be noted that although they are disposed side by side and obey common commands and drives, each of the two neck forming systems can pivot freely on its own vertical upright 27 because there is no rigid connection between the roller 38 and the link 36.

When the support element 13 reaches the end of its movement, the roller 35 mounts the cam 42 which controls the opening of the forming rollers 29; the outer rods 30a move towards the centre of the rotor and the rods 30b move towards the outside so that the rollers 29 move apart to allow the passage of the next tubes carried by the rotor, which continues to rotate in the direction of the arrow X.

To allow passage of the end of the glass tube on the return of the support means to the initial position, the forming rollers 29 are held in their spaced position by a known spring-loaded catch (not shown). This catch is accommodated in a notch in the rod 43a borne by the bearing 21 and held by the bolt 43; on the return movement of the support element 33 the bolt 43 is liberated by its passage over the cam 44 which occurs when the support means 13 has returned to its initial position against the stop 19.

The return movement of the support means is obtained by compression springs, e.g., 12a disposed on the guide track rods 12. Simultaneously with this return movement the entire movable system borne by the bearer element 22 moves away from the centre of the rotor by means of the circular pivoting cam 55 at the end of the arms 56a terminating in bearing 56; the pivoting cam 55 is moved by the roller 57 on the rotor; this roller acts on the boss 58 of the cam 55 which it pivots outwards. Since the roller 49 has dropped below the cam 46 at that time, the side rollers 54 connected to the member 50 have also dropped and assume a position opposite the cam 55 which has pivoted. In this way when the support means 13 returns to its initial position by the action of the spring 12a, the rollers 54 travel over the circular cam 55 which has pivoted so that the link 51 is moved away from the rotor so that all the movable system mounted on the bearer element 22 moves away from the rotor.

After the above-described operations, the support means 13 has returned to its initial position against the stop 19; the supporting elements 25 then again bear on the bottom part 23 of the next two top grippers of the rotor which has continued to rotate; this positioning is possible because the cylindrical cam 55a has resumed its position by pivoting inwards when the roller 57 left the cam 58. Simultaneously, the roller 15 of the slidable rods 14 is accommodated in the corresponding notch 16b of a next lug 16. The operations can then recommence for a new neck forming cycle on the next two tubes which have been brought into the required position by the continuous rotation of the rotor, in the direction of the arrow X. At that moment, the roller 49 will remount the cam 46 and bring the mandrel 33 into the ends of the next glass tubes for forming by the two groups of forming rollers 29 which are applied to the outside of the tubes by the roller 35 acting on the link 36 which in turn acts on the outer rods 30a. The operations are repeated and continue as described each time on two successive tubes, this being very advantageous to increase output.

As soon as the neck is formed on the tube neck separation is carried out in known manner; the same is true of the finishing of the base of the separated bottle which is removed by a bottom gripper and the preparation of the tube end to produce the next bottle which is all carried out in known manner; these operations for the separation of the bottle, finishing of the separated bottle and preparation of the tube end need not therefore be described here.

During the forming of the glass tube end additional heating is provided by two burners 59 mounted to be slidable midway between the mandrels 33 on the end of a rod 60 connected to the link 51; the rod 60 slides in the arm 61 which is connected to the bearer element 22; the burners 59 are adjusted as to height by means of the adjustable stop 62.

Figure 3:
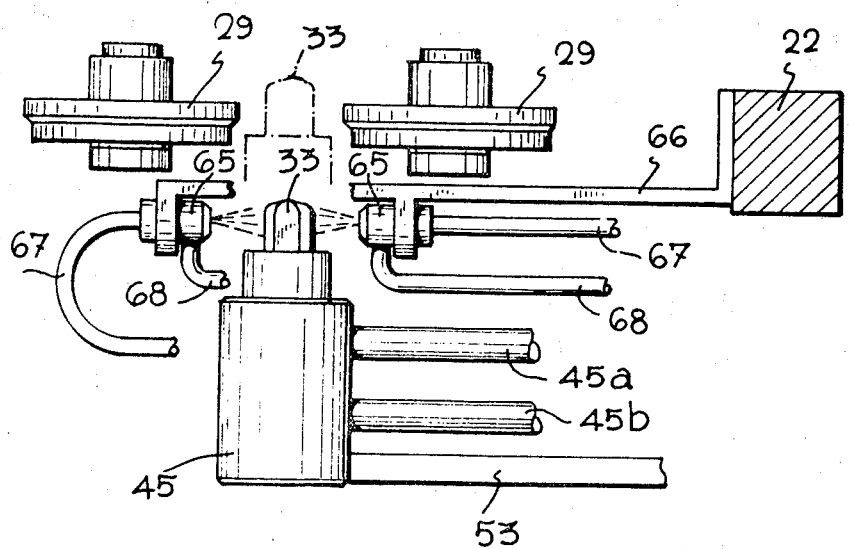
FIGURE 3 is a diagrammatic view showing the mandrel lubrication and cooling system, also on an enlarged scale.

During the ascent of the roller 49 on the cam 46, the rod 60 also undergoes this ascent movement and therefore raises the support 63 of the burners 59 until it stops against the stop 62. When the roller 49 leaves the cam 46 the rod 60 redescends and its lug 64 drives the support 63 and the burners 59 so that the supplementary burners 59 and their support are brought to a level below the level of the end of the tubes supplied in the next grippers; in this way these burners do not form an obstruction to the return of the support means to its initial position. Each mandrel 33 is formed by a flattened element the ends of which have two rounded or cylindrical surface portions (see FIGURE 3); the flattened element is hollow and is mounted on a hollow bush 45 secured to the ends of the arms 53. The hollow bush is provided with two conduits 45a and 45b for circulation of a cooling fluid, e.g., oil or water, supplied via a flexible conduit (not shown). This internal cooling is associated with external cooling which also provides lubrictaion by means of two sprays 65 which are held on the support element 22 by the arms 66 on either side of the body of each mandrel 33 so that the jets of oil issuing therefrom meet the diametric cylindrical surfaces. This spraying is produced by air injected into the pipe 67 which draws the oil supplied via the conduit 68. The oil sprayed to the mandrel 33 is controlled at the appropriate time by valves (not shown) disposed on the machine.

What I claim is:

1. A machine for the manufacture of bottles with a neck produced by forming the end of glass tubes, comprising a stator, working stations carried by said stator, a rotor, means mounting the rotor for rotation about an upright axis, top grippers and bottom grippers on said rotor for holding glass tubes which are brought successively into register with said working stations, a bottom part in each top gripper, two neck-forming systems disposed side by side and each having two forming rollers and a mandrel, two slidable support elements each supporting one of said two neck-forming systems a bearer element supporting said two slidable support elements, a support means for said bearer element, a guide track on which slides said support means, a engaging means for temporarily engaging said support means to said rotor to drive said support means over a limited path, a disengaging means for disengaging said support means from said rotor at the end of the travel of said support means, a return means for pushing said support means back into its initial position, and a supporting element for said guide track mounted on said stator.

2. A machine according to claim 1 characterized in that said two bearing elements carried by one of said slidable support elements each terminates in a fork terminating in rollers bearing on said bottom part of said top grippers so as to maintain said neck-forming systems and said two forming rollers perfectly adjusted relative to the axis of said grippers.

3. A machine according to claim 1 characterized in that said support means for said bearer element slides on a guide track formed by straight rods disposed substantially parallel to a plane tangential to the rotor.

4. A machine according to claim 1, and means mounting the last-named element for movement away from the rotor in order to facilitate adjustment or cleaning.

5. A machine according to claim 1 in which the mandrels of each neck-forming system are mounted on vertical rods which are mounted at the ends of a link having a member to which are secured a roller running on a cam for providing vertical sliding movement to said mandrels and side rollers cooperating with a circular cam urged pivotally outwards of the stator by a roller provided on the rotor so as to move away from said rotor said link and said neck-forming systems with said mandrels for enabling said systems to pass near the rotating grippers on the rotating rotor when the support means returns to its initial position.

References Cited

UNITED STATES PATENTS

| 2,935,819 | 5/1960 | Dichter | 65—280 |
| 3,155,481 | 11/1964 | Boyce | 65—104 |
| 3,202,495 | 8/1965 | Zauner | 65—277 |

FOREIGN PATENTS

| 621,327 | 6/1961 | Canada. |

DONALL H. SYLVESTER, *Primary Examiner.*

JOHN H. HARMAN, *Assistant Examiner.*

U.S. Cl. X.R.

65—108, 109, 275, 277, 280, 292